(12) United States Patent
Khalil et al.

(10) Patent No.: US 9,292,504 B2
(45) Date of Patent: Mar. 22, 2016

(54) CONTEXT GENERATION FROM ACTIVE VIEWING REGION FOR CONTEXT SENSITIVE SEARCHING

(75) Inventors: Manah Mounir Khalil, Irving, TX (US); Padala Anil Kumar Reddy, Flower Mound, TX (US); Abhishek Nagpal, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 351 days.

(21) Appl. No.: 13/326,374

(22) Filed: Dec. 15, 2011

(65) Prior Publication Data

US 2013/0159835 A1    Jun. 20, 2013

(51) Int. Cl.
*G06F 17/00* (2006.01)
*G06F 17/30* (2006.01)

(52) U.S. Cl.
CPC ...... *G06F 17/30011* (2013.01); *G06F 17/3064* (2013.01); *G06F 17/30398* (2013.01); *G06F 17/30864* (2013.01)

(58) Field of Classification Search
CPC .................................................. G06F 17/30864
USPC .......................................................... 715/234
See application file for complete search history.

(56) References Cited

U.S. PATENT DOCUMENTS

| 6,873,982 | B1 * | 3/2005 | Bates et al. .................... 707/737 |
| 7,827,170 | B1 * | 11/2010 | Horling et al. ................. 707/722 |
| 2003/0101412 | A1 * | 5/2003 | Eid ................................ 715/513 |
| 2005/0222989 | A1 * | 10/2005 | Haveliwala et al. ............... 707/3 |
| 2006/0048073 | A1 * | 3/2006 | Jarrett et al. .................... 715/784 |
| 2007/0233671 | A1 * | 10/2007 | Oztekin et al. ..................... 707/5 |
| 2009/0077658 | A1 * | 3/2009 | King et al. ........................ 726/21 |
| 2010/0281400 | A1 * | 11/2010 | Forutanpour et al. .......... 715/760 |
| 2011/0035656 | A1 * | 2/2011 | King et al. ..................... 715/234 |

* cited by examiner

*Primary Examiner* — Laurie Ries
*Assistant Examiner* — Zaida I Marrero

(57) ABSTRACT

A device retrieves content and renders a user-selected portion of the retrieved content in a browser as an active content viewing region. The device scans the active content viewing region to generate a scan, and generates context from the scan of the active content viewing region. A corpus of documents is searched based on the generated context.

20 Claims, 14 Drawing Sheets

CONTEXT GENERATION FROM ACTIVE VIEWING REGION FOR CONTEXT SENSITIVE SEARCHING

BACKGROUND

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

A web crawler is typically used to find and retrieve documents (e.g., web pages) on the web. To retrieve a document from the web, the web crawler sends a request to, for example, a web server for a document, downloads the entire document, and then provides the document to an indexer. The indexer typically takes the text of the crawled document, extracts individual terms from the text and sorts those terms (e.g., alphabetically) into a search index. The web crawler and indexer repeat this process as the web crawler crawls documents across the web. Each entry in the search index contains a term stored in association with a list of documents in which the term appears and the location within the document where the term appears. The search index, thus, permits rapid access to documents that contain terms that match search terms of a user supplied search query. To improve search performance, the indexer typically ignores common words, called stop words (e.g., the, is, on, or, of, how, why, etc.) when creating or updating the search index. Existing indexers create a single search index that contains terms extracted from all documents crawled on the web.

Generally, search engines may base their determination of the user's interest on search terms (called a search query) entered by the user. The goal of the search engine is to identify links to high quality, relevant results (e.g., web pages) based on the search query using the search index. Typically, the search engine accomplishes this by matching the terms in the search query to terms contained in the search index, and retrieving a list of documents associated with each matching term in the search index. Documents that contain the user's search terms are considered "hits" and are returned to the user. The "hits" returned by the search engine may be ranked among one another by the search engine based on some measure of the quality and/or relevancy of the hits. A basic technique for sorting the search hits relies on the degree with which the search query matches the hits. For example, documents that contain every term of the search query or that contain multiple occurrences of the terms in the search query may be deemed more relevant than documents that contain less than every term of the search query or a single occurrence of a term in the search query and, therefore, may be more highly ranked by the search engine.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
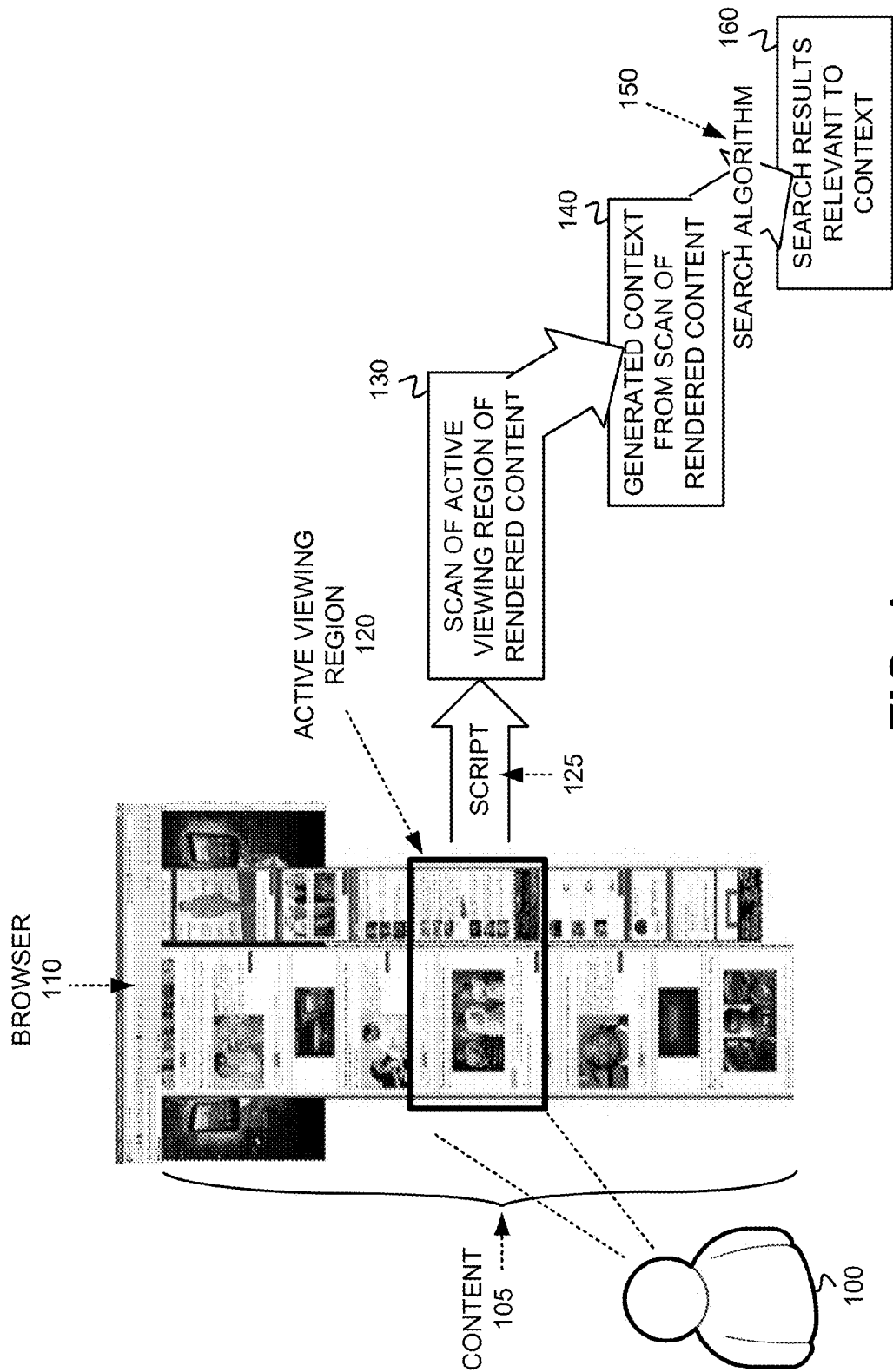
FIG. 1 illustrates an overview of context generation for a context sensitive search from a region of content actively viewed by a user browsing the content.

FIG. 1 illustrates an overview of context generation for a context sensitive search from a region of content actively viewed by a user browsing the content. As shown in FIG. 1, a user 100 may retrieve a document having content 105 for display in a window of a browser 110. The document may include any machine-readable and machine-storable work product. A document may include, for example, an e-mail, an image, video, a website, a business listing, a file, a combination of files, one or more files with embedded links to other files, a news group posting, a blog, an advertisement, a digital map, etc. In the context of the Internet, a common document is a web page. Documents often include textual information and may include embedded information (such as meta information, images, hyperlinks, etc.) and/or embedded instructions (such as Javascript, etc.). Content 105 may include data that may or may not be in document form. Examples of content may include data associated with a document or data in a database. User 100 may include one or more people, such as, for example, a person, a group of people that may have some relationship (e.g., people associated with a business or organization), or a group of people with no formal relationship.

The browser may render and display a user-selected portion of content 105 within browser 110, shown in FIG. 1 as active viewing region 120. For example, user 100 may scroll through content 105 to stop and read the portion of content 105 corresponding to active viewing region 120. Active viewing region 120, therefore, may include a portion of content 105 displayed within browser 110 for a threshold period of time (i.e., displayed for at least 5 seconds, etc.). Active viewing region 120 may be defined by the limits of the portion of content 105 rendered and actually displayed within the window of browser 110. Active viewing region 120 may not include the remaining portion of content 105 of the document that is not displayed within the window of browser 110.

A script 125, contained within content 105, retrieved from browser 110 (e.g., a toolbar of browser 110), or received from an external server (not shown), may be executed to create a scan 130 of the rendered and displayed portion of content of active viewing region 120, and to generate context 140 from scan 130. The generated context 140 may include text rendered and displayed by the browser within active viewing region 120. Generated context 140 may not include text from content 105 not rendered and displayed within active viewing region 120 of browser 110. In one implementation, generated context 140 may include a scan of the rendered Hypertext Markup Language (HTML) within active viewing region 120. A search algorithm 150, using generated context 140, may obtain search results 160 that are relevant to generated context 140. Search algorithm 150 may include any type of search algorithm that searches a corpus of documents to identify one or more documents having content that is relevant to context 140.

Figure 2:
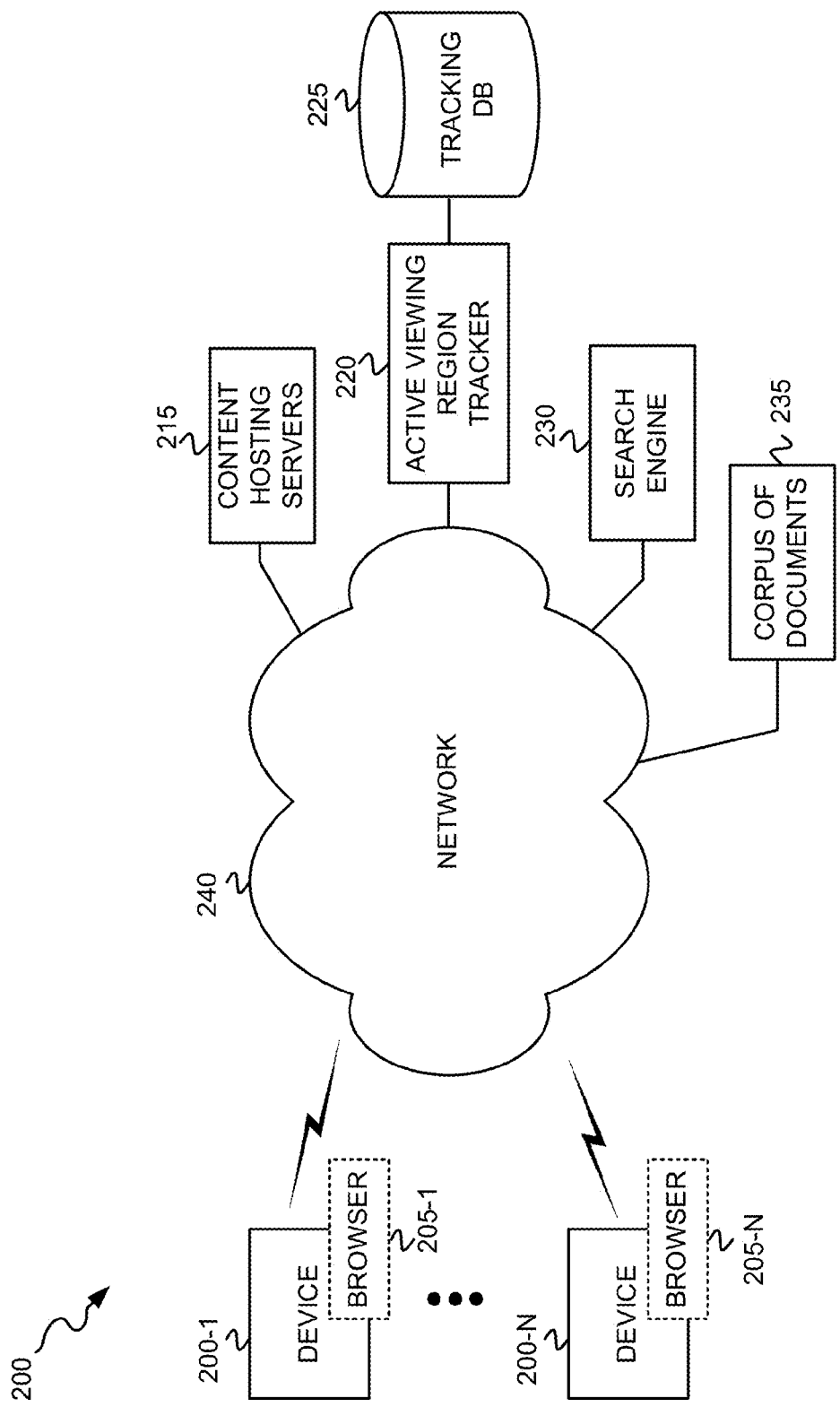
FIG. 2 is a diagram that illustrates an exemplary network environment in which context may be generated from regions of content actively viewed by a user browsing the content to perform context sensitive searches of a corpus of documents.

FIG. 2 is a diagram that illustrates an exemplary network environment 200 in which context may be generated from regions of content actively viewed by a user browsing the content, according to implementations described herein, to perform context sensitive searches of a corpus of documents. As shown in FIG. 2, network environment 200 may include devices 200-1 through 200-N, content hosting servers 215, an active viewing region tracker 220, a tracking database (DB) 225, a search engine 230, a corpus of documents 235, and a network 240.

Each of devices 200-1 through 200-N (generically and individually referred to herein as "device 200") may include a computational device that may communicate view network 240. For example, devices 200-1 through 200-N may each include a cellular telephone (e.g., a smart phone), a computer (e.g., desktop, laptop, palmtop, or tablet computer), or a Personal digital Assistant (PDA). Devices 200-1 through 200-N may execute a respective one of browsers 205-1 through 205-N (generically and individually referred to herein as "browser 205"). Each of browsers 205-1 through 205-N may access content hosted by content hosting servers 215 and may render and display a user-selected portion of the content in a window of browser 205.

Content hosting servers 210 may each include a network device that hosts (e.g., stores for on-demand retrieval) content that can be accessed and retrieved by browsers 205-1 through 205-N of devices 200-1 through 200-N. A server of content hosting servers 215 may supply a document containing content to browser 205 of device 200 that accesses and requests the document via network 240.

Active viewing region tracker 220 may include a network device that receives data from browsers 205-1 through 205-N related to active viewing regions viewed in a window of browsers 205-1 through 205-N. The data related to the active viewing regions viewed in browsers 205-1 through 205-N may include identifications of specific regions of content viewed within documents, frequencies of viewing those specific regions by users, and amounts of time spent viewing those specific regions by users.

Tracking DB 225 may store the data related to the active viewing regions viewed in browsers 205-1 through 205-N. Tracking DB 225 may receive the data from active viewing region tracker 220. Search engine 230 may include a network device that performs searches of corpus of documents 235, based on context generated by browsers 205-1 through 205-N, to obtain search results that are relevant to the generated context. Search engine 230 may additionally include a web crawler and an indexer. The web crawler finds and retrieves documents hosted by content hosting servers 215, downloads the entirety of the documents, and provides the documents to the indexer. The indexer typically takes the text of the crawled document, extracts individual terms from the text and sorts those terms into a search index. The web crawler and indexer repeat this process as the web crawler crawls documents across the web.

Corpus of documents 235 may include a collection of documents containing searchable content. Corpus of documents 235 may, for example, store a corpus of HTML documents. The collection of documents may include copies of documents hosted by content hosting servers 215. Corpus of documents 235 may additionally, or alternatively, store the search index generated by the web crawler and indexer of search engine 230. In one implementation, corpus of documents 235 may include a collection of advertisements related to products and/or services that are for sale.

Network 240 may include any type of network, or combination of networks, that may permit communication among the elements of network environment 200. Network 240 may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet.

The configuration of network components of network environment 200 illustrated in FIG. 2 is for illustrative purposes only. Other configurations may be implemented. Therefore, network environment 200 may include additional, fewer and/or or different components than those depicted in FIG. 2. For example, in some implementations, active viewing region tracker 220 and search engine 230 may be implemented by a single network device.

Figure 3:
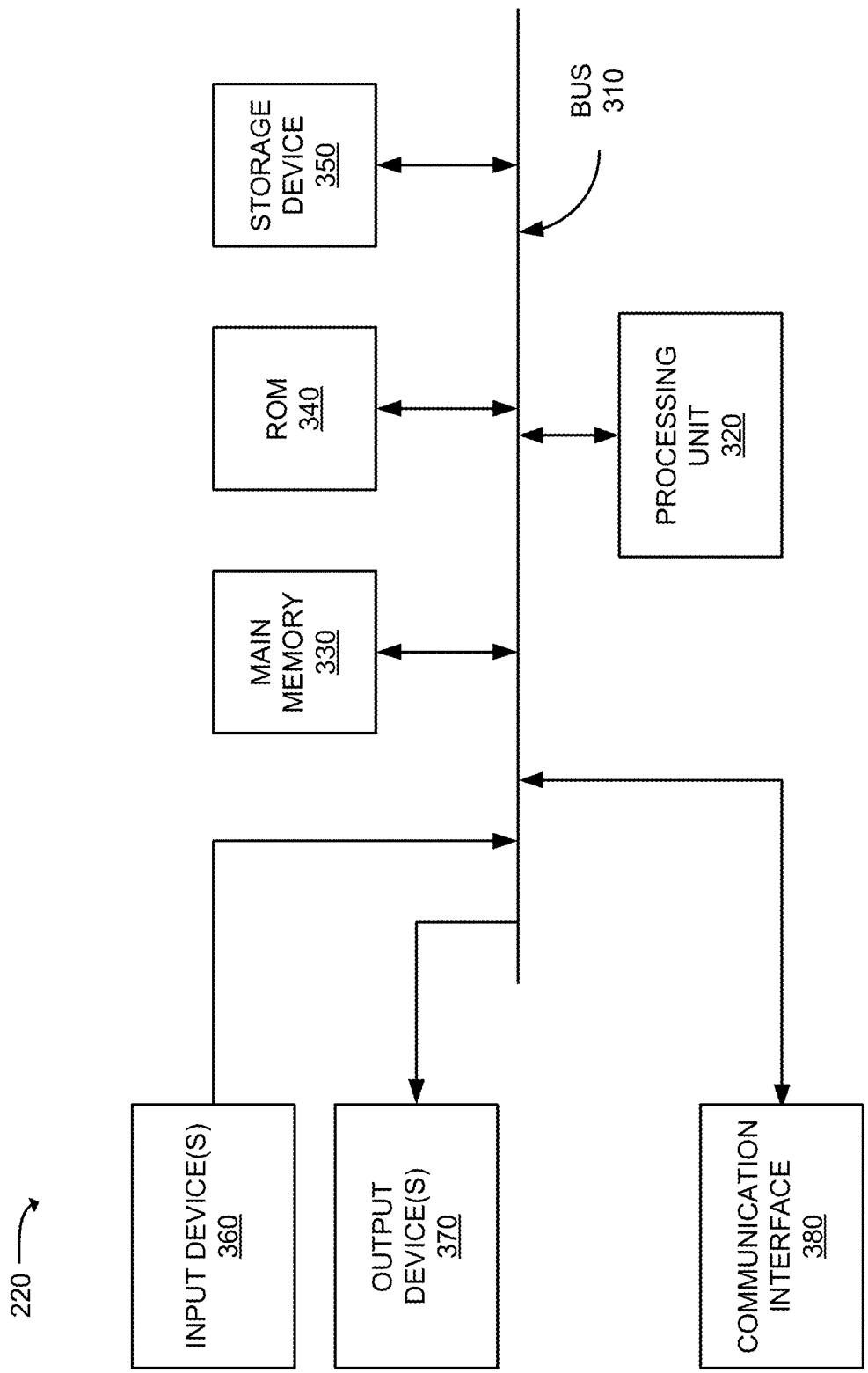
FIG. 3 is a diagram that depicts exemplary components of the active viewing region tracker of FIG. 2.

FIG. 3 is a diagram that depicts exemplary components of active viewing region tracker 220. Content hosting server(s) 210 and search engine 230 may be similarly configured. Active viewing region tracker 220 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of active viewing region tracker 220.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium.

Input device 360 may include one or more mechanisms that permit an operator to input information to active viewing region tracker 220, such as, for example, a keypad or a keyboard, a display with a touch sensitive panel, voice recognition and/or biometric mechanisms, etc. Output device 370 may include one or more mechanisms that output information to the operator, including a display, a speaker, etc. Communication interface 380 may include any transceiver mechanism that enables active viewing region tracker 220 to communicate with other devices and/or systems. For example, communication interface 380 may include wired or wireless transceivers for communicating via network 240.

The configuration of components of active viewing region tracker 220 illustrated in FIG. 3 is for illustrative purposes only. Other configurations may be implemented. Therefore, active viewing region tracker 220 may include additional, fewer and/or different components than those depicted in FIG. 3.

Figure 4:
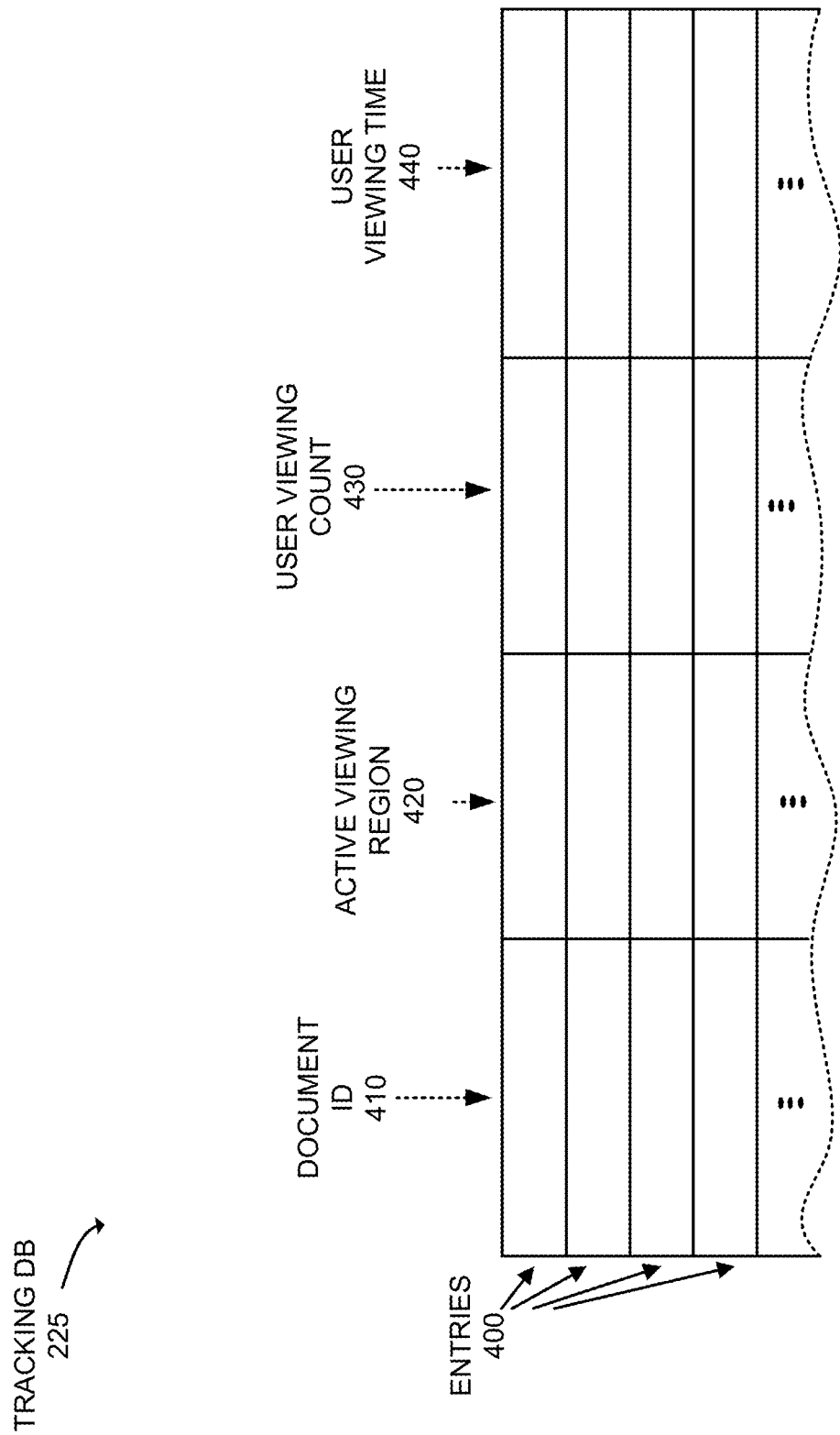
FIG. 4 depicts an exemplary data structure stored in the tracking database of FIG. 2.

FIG. 4 depicts an exemplary data structure stored in tracking DB 225. The data structure of tracking DB 225 may include multiple entries 400, each of which includes a document identifier (ID) field 410, an active viewing region field 420, a user viewing count field 430, and a user viewing time field 440. Document ID field 410 may uniquely identify a document that contains content. Document ID 410 may, for example, store the Uniform Resource Locator (URL) of the document. Active viewing region field 420 may uniquely identify a portion of content of the document identified by document ID 410. In one implementation, active viewing region 420 may store the entirety of the context generated for the portion of content. User viewing count field 430 may identify a number of times that users of browsers 205-1 through 205-N viewed the active viewing region identified by field 420. User viewing time field 440 may identify an average amount of time that users of browsers 205-1 through 205-N spent viewing the active region identified by field 420.

Figure 5:
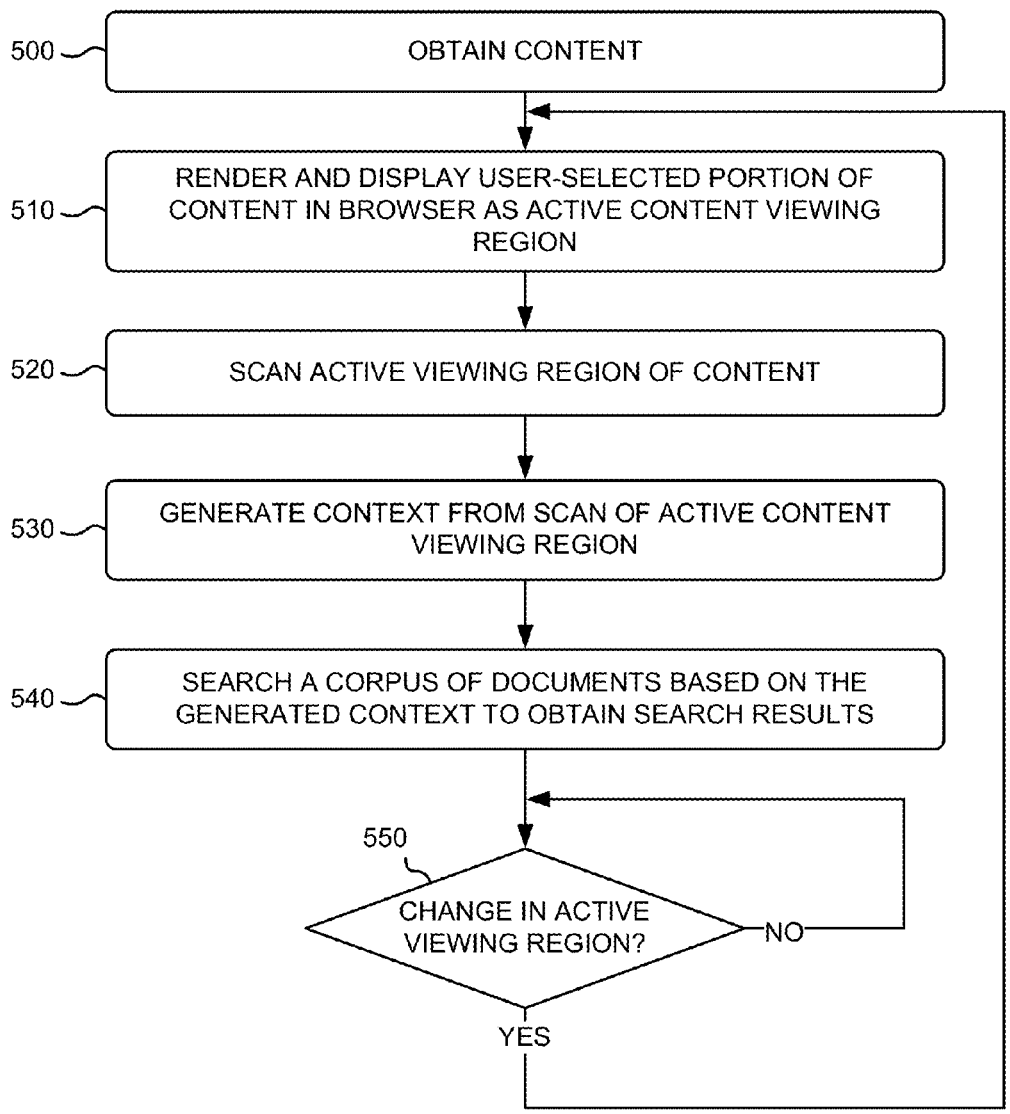
FIG. 5 is a flow diagram that illustrates an exemplary process for generating context for a context sensitive search from a region of content actively viewed by a user in a browser.

FIG. 5 is a flow diagram that illustrates an exemplary process for generating context for a context sensitive search from a region of content actively viewed by a user in a browser. The exemplary process of FIG. 5 may be implemented by device 200, active viewing region tracker 220 and/or search engine 230. The exemplary process of FIG. 5 is described below with reference to the diagrams of FIGS. 6-13.

Figure 6:
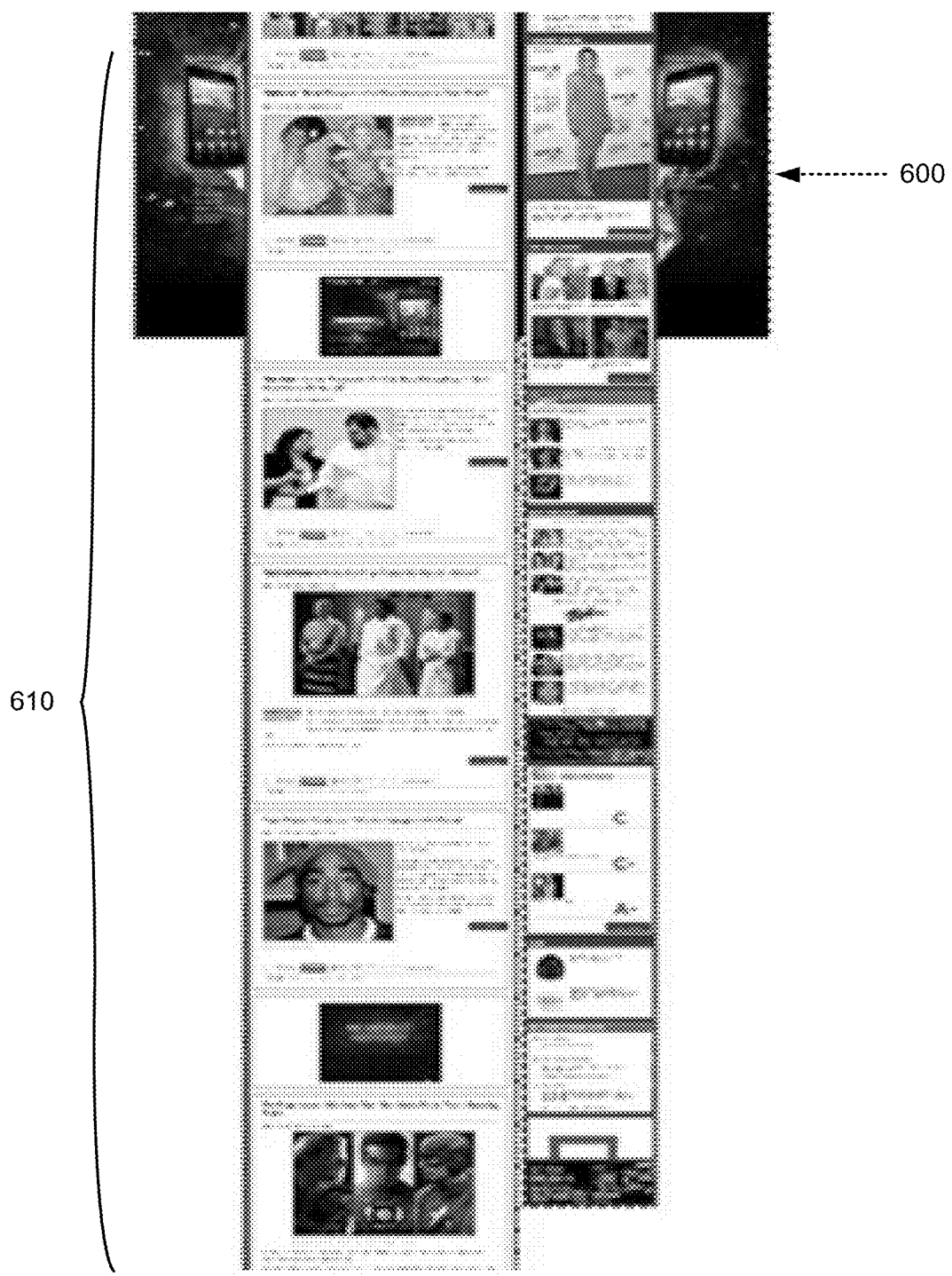
FIG. 6 is a diagram that includes an example of a document containing content accessed by a browser in the exemplary process of FIG. 5.

The exemplary process may include obtaining content (block 500). Browser 205 of device 200 may receive a URL associated with a document hosted at content hosting servers 215. The URL may, for example, be entered by a user of device 200, or may be retrieved from another document displayed in browser 205. Browser 205 may retrieve the document from content hosting servers 215 using the URL. FIG. 6 depicts a document 600 containing content 610 retrieved by browser 205 from content hosting servers 215.

Figure 7:
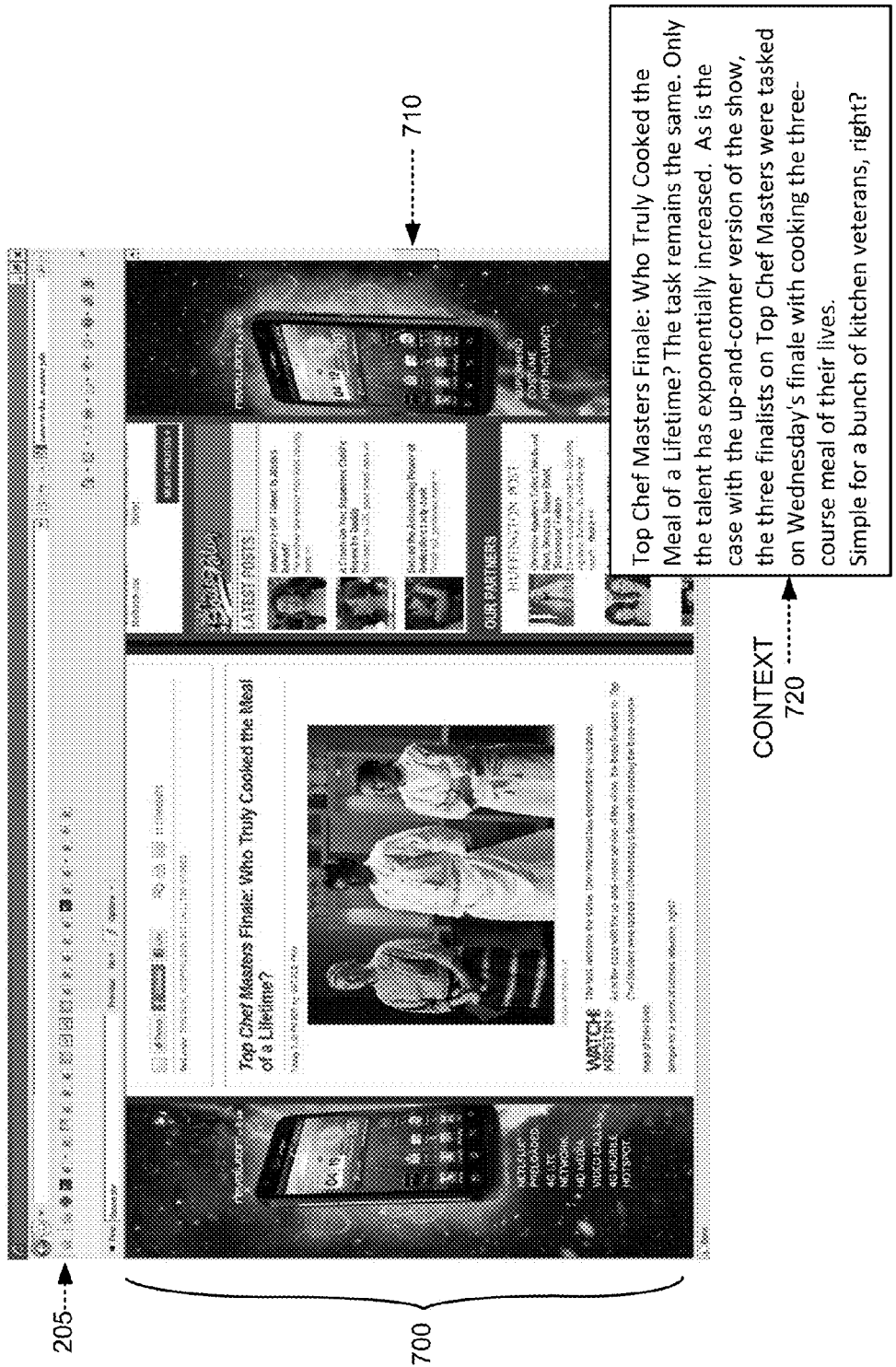
FIGS. 7 and 11-13 are diagrams that include examples of portions of content viewed within a window of a browser, and context generated from the viewed portions of content or from user input into editable fields of the viewed portions of the content.

Browser 205 of device 200 may render and display a user-selected portion of the content as an active content viewing region (block 510). Once document 600 is retrieved from content hosting servers 215, browser 205 may render and display a portion of content 610 based on browser 205's user controls. For example, if document 600 includes a HTML document, browser 205 may render document 600 a rendered HTML. In one implementation, browser 205 may have a scroll bar that permits the user to scroll down through content 610. For example, as shown in FIG. 7, browser 205 may display a portion 700 of content 610 to which the user of browser 205 may scroll using a scroll bar 710. Portion 700 represents the active viewing region of content 610 shown in the window of browser 205.

Figure 11:
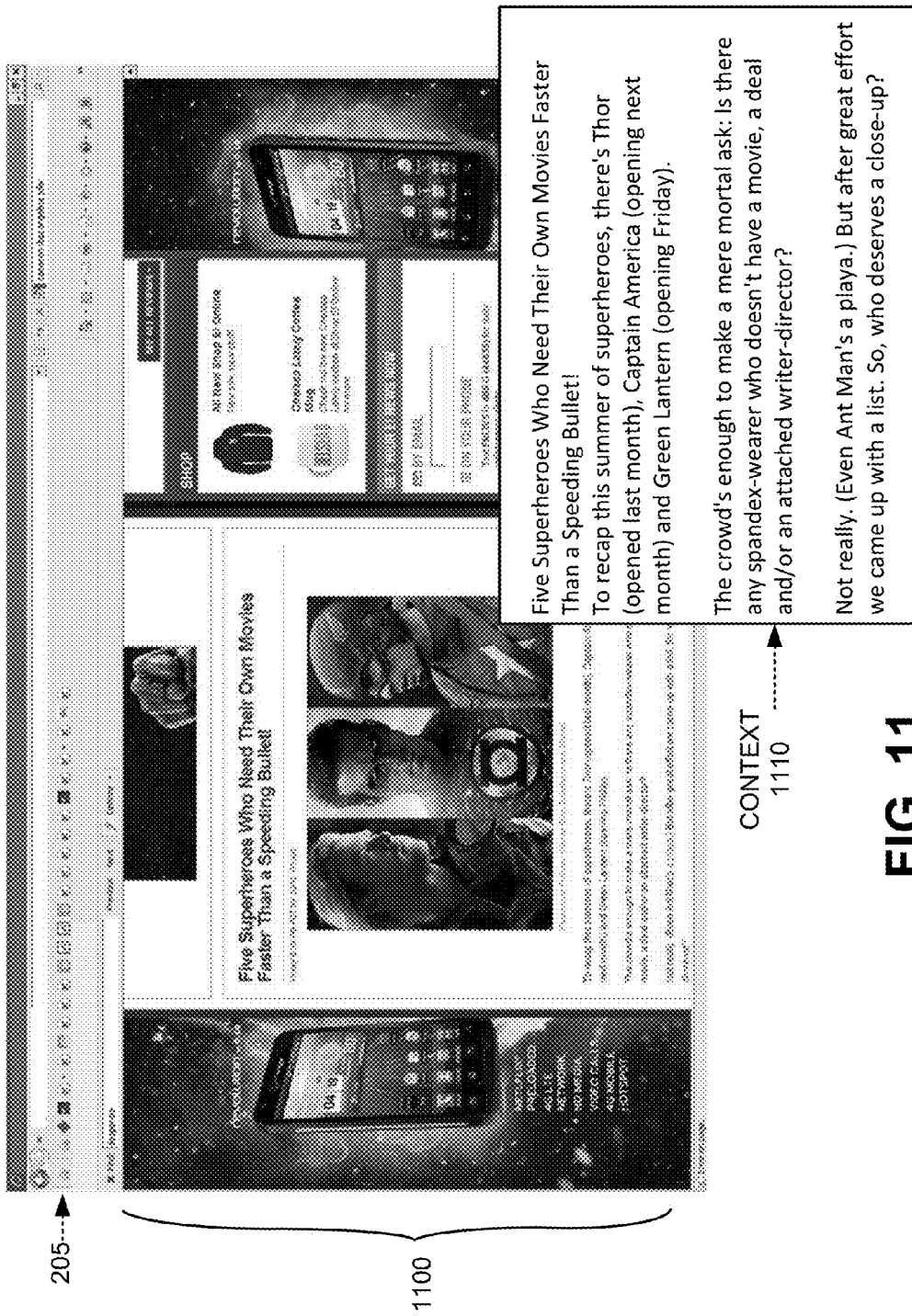

Browser 205 of device 200 may scan the active viewing region of content (block 520) and may generate context from the scan of the active content viewing region (block 530). Browser 205 may execute a script for scanning the active viewing region of the content and for generating the context from the scan of the active content viewing region. In one implementation, the script may execute a character recognition process for identifying text within the scan of the rendered HTML (or other types of content). In another implementation, the script may programmatically extract the text from the scan of the rendered HTML. FIG. 7 depicts an example of context 720 generated from the specific active content viewing region 700 displayed in the window of browser 205. The executed script may extract the text from active content viewing region 700 as a string of text, and provide the string of text as the generated context 720. As can be seen in FIG. 7, active content viewing region 700 represents a portion of content 610 of document 600 of FIG. 6. FIG. 11 depicts another example of context 1110 generated from a specific active content viewing region 1100 displayed in the window of browser 205. As can be seen in FIG. 11, active content viewing region 1100 represents another portion of content 610 of document 600 of FIG. 6 that is different than the portion represented by active content viewing region 700 of FIG. 7.

Figure 8:
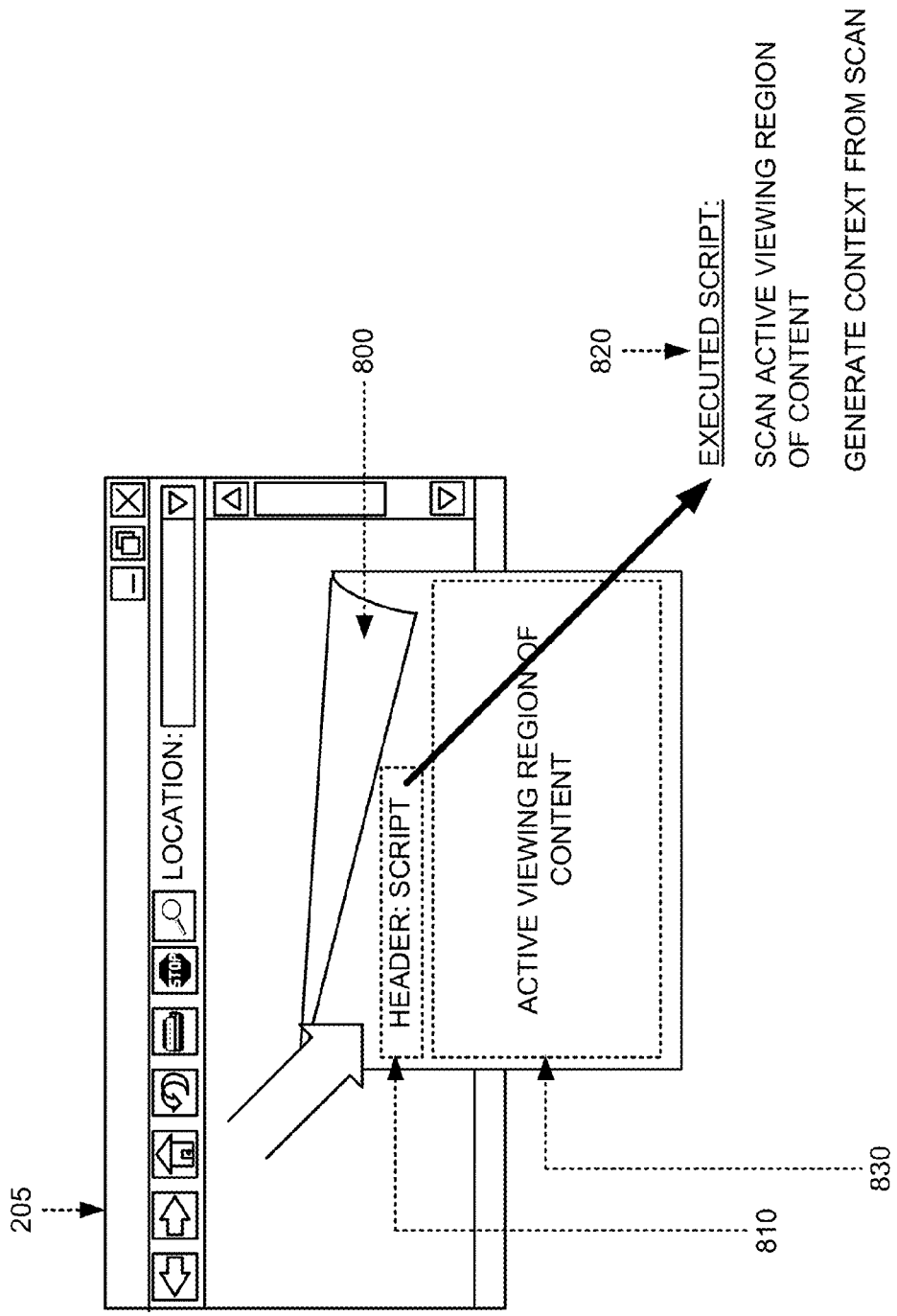
FIG. 8 is a diagram that depicts an exemplary implementation in which a header of a document containing content document includes script that scans an active viewing region of the content and generates context from the scan.
Figure 9:
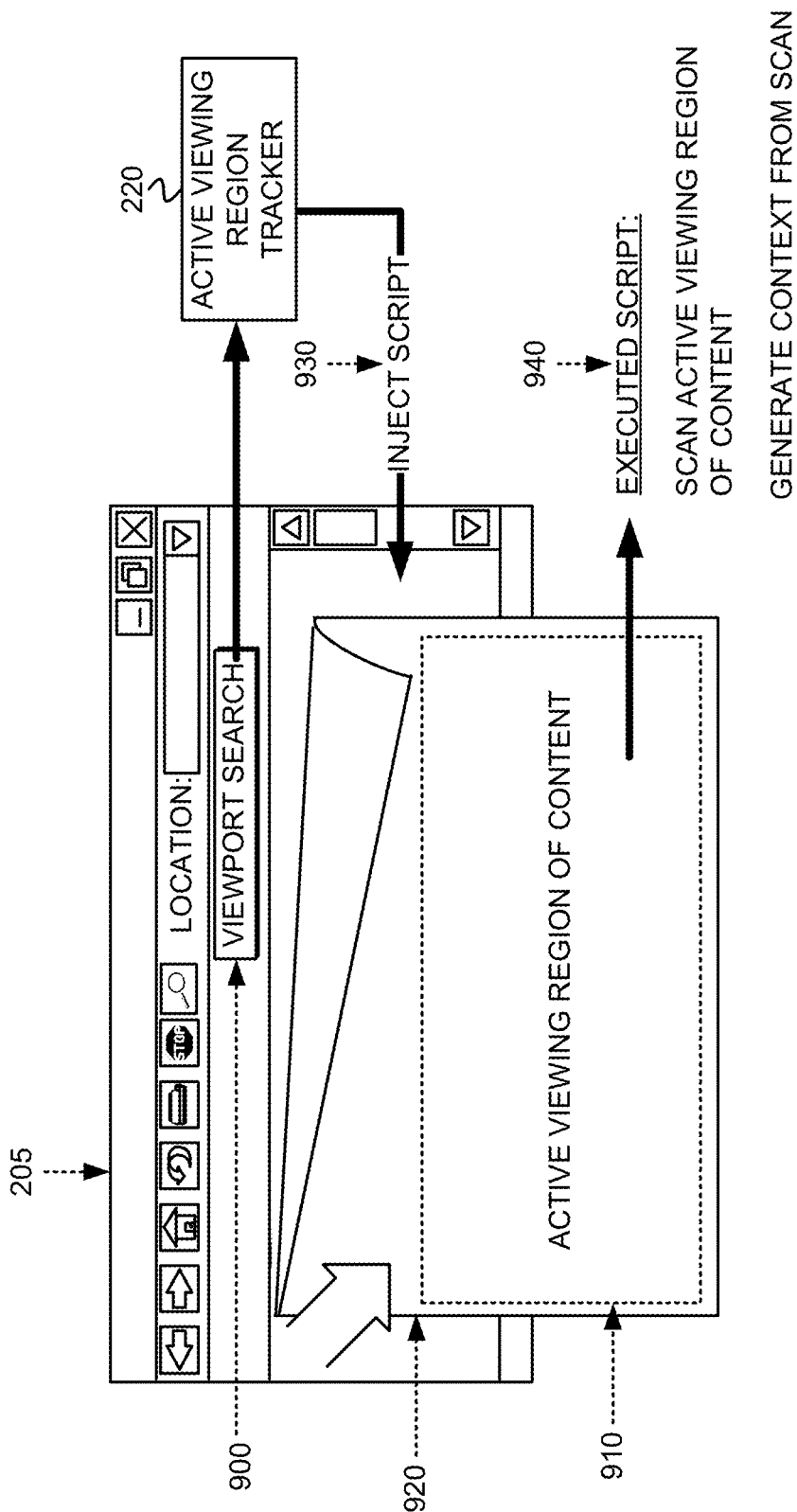
FIG. 9 is a diagram that depicts an exemplary implementation in which the active viewing region tracker of FIG. 2 injects script, into the browser used to browse a document containing content, to scan an active viewing region of the content and to generate context from the scan.
Figure 10:
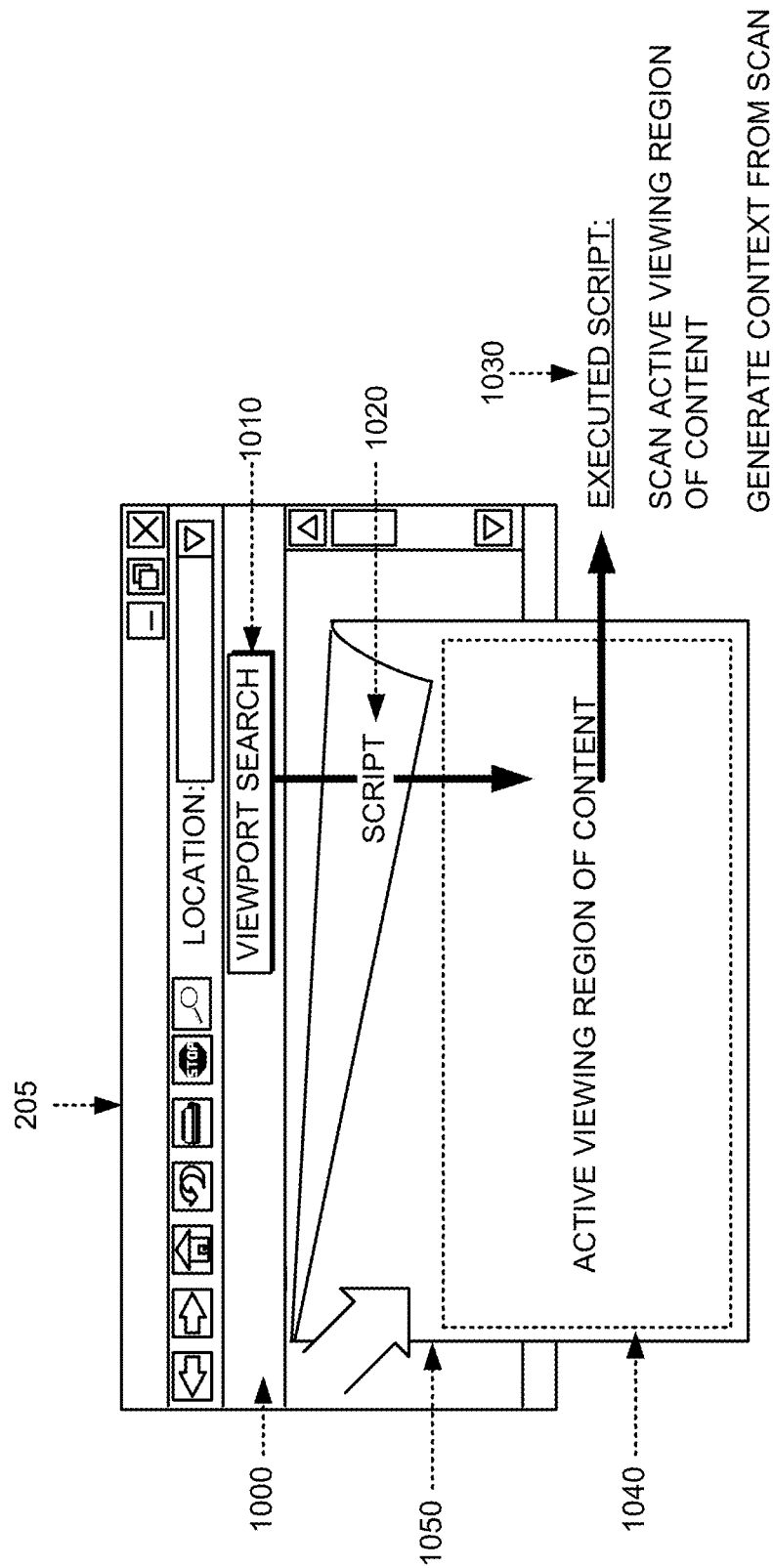
FIG. 10 is a diagram that depicts an exemplary implementation in which a toolbar of a browser used to browse a document containing context executes a script to scan an active viewing region of the content and to generate context from the scan.

Browser 205 may obtain and execute the script, used to scan the active viewing region and generate the context, in a number of different ways. In one implementation, as shown in FIG. 8, browser 205 may retrieve a script 810 stored in a header of document 800 being viewed within browser 205. The executed script 820 may scan the active viewing region 830 of the content of document 800 and generate context from the scan. In another implementation, shown in FIG. 9, a user may select a button 900 (e.g., "viewport search" button shown in FIG. 9) on browser 205 while viewing an active viewing region 910 of content of a document 920. Browser 205 may contact active viewing region tracker 220 which, in turn, may inject a script 930 into browser 205. Browser 205 may execute the script 940 to scan the active viewing region 910 of the content and to generate context from the scan. In a further implementation, shown in FIG. 10, a user may select a button 1010 from a toolbar 1000 of browser 205, and a script 1020 may be retrieved from toolbar 1000. Script 1020 may be executed 1030 to scan active viewing region 1040 of the content of document 1050 to generate context from the scan. Browser 205 of device 200 may provide the generated context to search engine 230.

Figure 12:
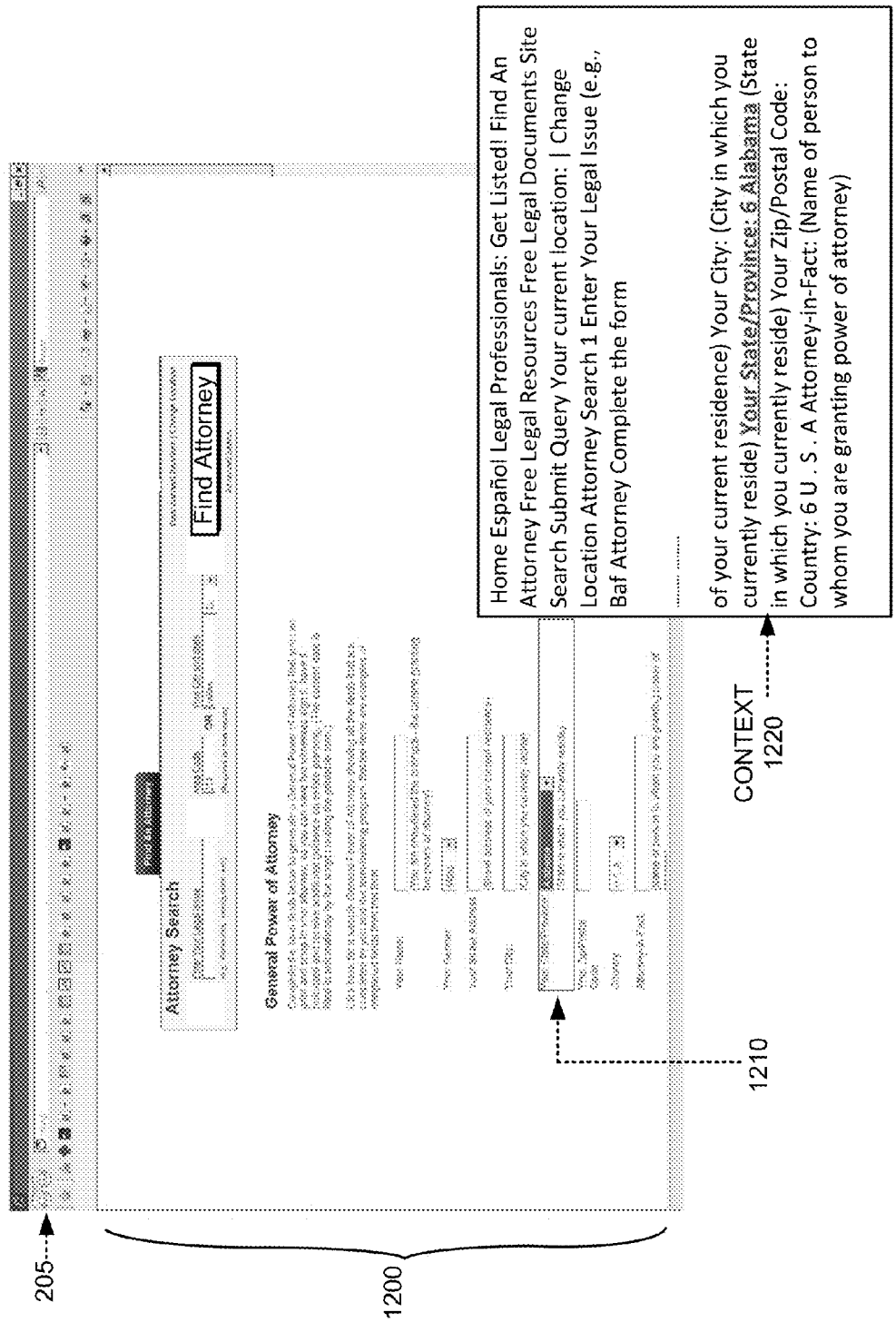

FIG. 12 depicts yet another example of context 1220, generated from a specific active content viewing region 1200 displayed in the window of browser 205, where the content includes a fillable form. As shown in FIG. 12, the fillable form may include at least one fillable entry 1210 in the form. When the browser 205 executes the script, the data entered into fillable entry 1210 in the fillable form is extracted along with the rest of active content viewing region 1200 displayed in the window of browser 205.

Figure 13:
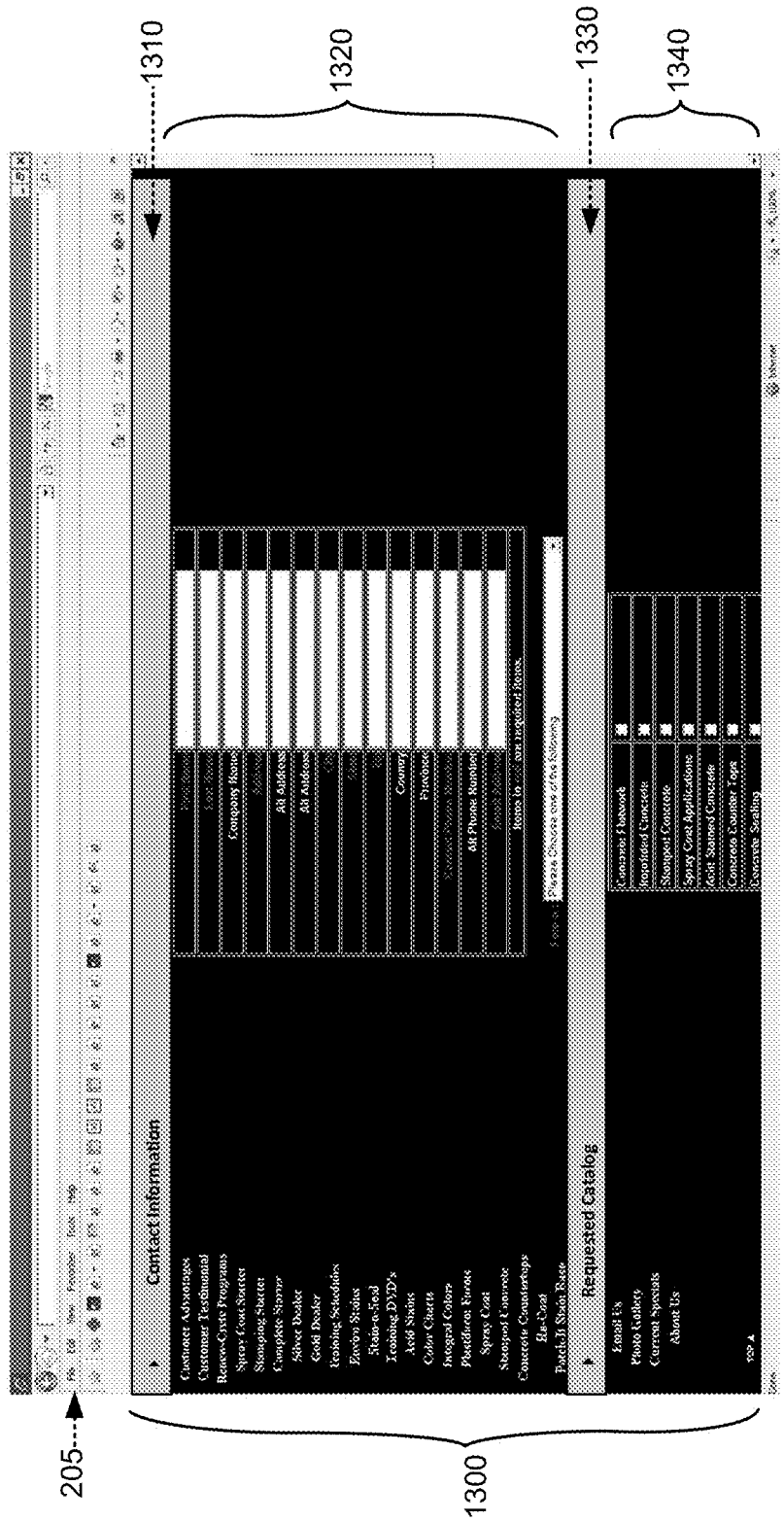

FIG. 13 depicts a further example of the generation of context from a specific active content viewing region 1300 displayed in the window of browser 205, where the content includes a fillable form and the fillable form includes expandable/collapsible sections. For example, as shown in FIG. 13, the fillable form of active content viewing region 1300 may include an expandible/collapsible "contact information" section 1310 that, when selected, expands to include multiple fillable entries 1320 related to various types of contact information. Similarly, the fillable form of active viewing region 1300 may include an expandible/collapsible "requested catalog" section 1330 that, when selected, expands to include multiple fillable entries 1340 related to types of catalogs requested. When browser 205 executes the script, the data entered into the fillable entries 1320 and 1340 of sections 1310 and 1330 of active content viewing region 1300 may be extracted along with the rest of active content viewing region 1300 displayed in the window of browser 205.

Search engine 230 may search corpus of documents 235 based on the generated context to obtain search results (block 540). Upon receipt of the context from browser 205, search engine 230 may perform a search of corpus of documents 235 to retrieve content that matches the context received from browser 205. For example, search engine 230 may match at least a portion of a sequence of text contained within the generated context with content contained in corpus of documents 235 to identify one or more documents having matching content. Search engine 230 may supply the identified one or more documents (or links to the identified one or more documents) having matching content to browser 205 for display to the user. If corpus of documents 235 includes a collection of advertisements, then search engine 230 may obtain a set of relevant advertisements based on the generated context. If corpus of documents 235 includes copies of content hosted by content hosting servers 215, then search engine 230 may obtain a set of content related to the generated context (i.e., related to the current active viewing region of content displayed in a window of browser 205 that may be of interest to the user).

Browser 205 of device 200 may identify whether there has been a change in the active viewing region (block 550). The user of browser 205, using user controls, such as, for example, a scroll bar, may scroll through the content of the document displayed in the window of browser 205. When the user has scrolled to another portion of the content, then the active viewing region may be considered to be changed. If there has been a change in the active viewing region (YES—block 550), then the exemplary process may return to block 510 with the rendering and display of the new user-selected portion of content in browser 205 as the new active content viewing region. The exemplary process may wait at block 550 (NO—block 550) until a change in the active viewing region occurs.

Figure 14:
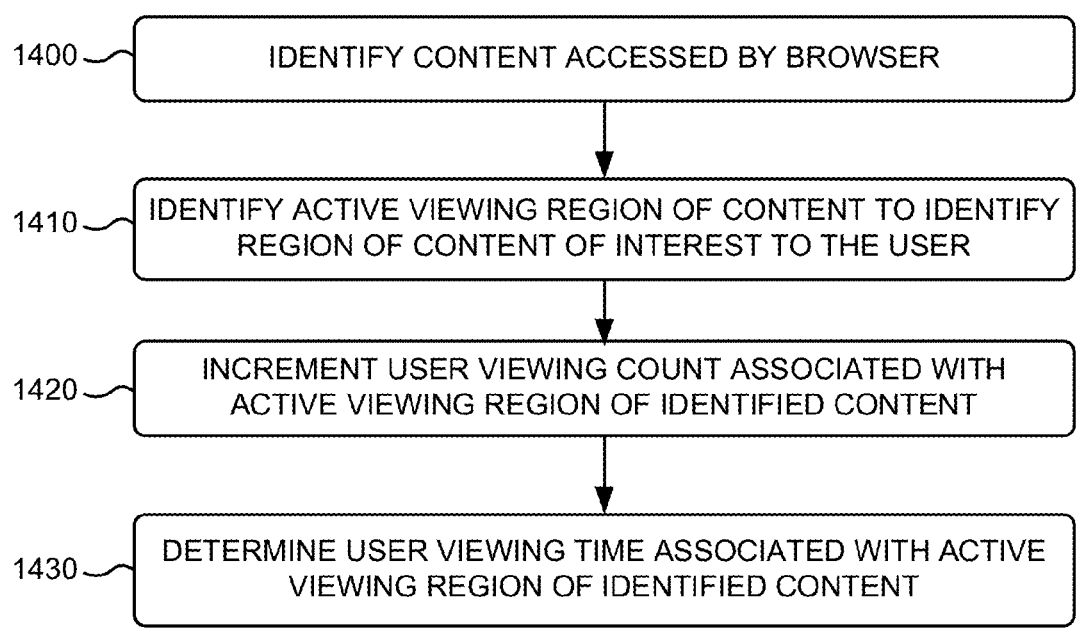
FIG. 14 is a flow diagram that illustrates an exemplary process for tracking user viewing of regions of content in a browser.

FIG. 14 is a flow diagram that illustrates an exemplary process for tracking the viewing of regions of content in a browser by users. The exemplary process of FIG. 14 may be implemented by active viewing region tracker 220.

The exemplary process may include identifying content accessed by browser 205 (block 1400). Active viewing region tracker 200 may obtain a document ID for the document accessed by browser 205. For example, active viewing region tracker 220 may obtain the URL for the document (e.g., web page) accessed by browser 205. Active viewing region tracker 220 may store the document ID in document ID field 410 of an entry 400 of tracking DB 225.

Active viewing region tracker 220 may identify the active viewing region of the content to identify the region of the content of interest to the user (block 1410). Active viewing region tracker 220 may determine and identify the portion of the document that is currently the active viewing region of the document content. Active viewing region tracker 220 may store the identifier associated with the portion of the document in active viewing region field 420 of an entry 400 of tracking DB 225. In one implementation, active viewing region tracker 220 may receive the entirety of the context generated by the executed script of browser 205 from device 200 and store the context in active viewing region field 420 as the identifier for the active viewing region of the content.

Active viewing region tracker 220 may increment the user viewing count associated with the active viewing region of identified content (block 1420). Each time the portion of the document, identified by document ID field 410 and active viewing region 420, is viewed by a user, active viewing region tracker 220 may increment the value stored in user viewing count field 430. For example, if user viewing count field 430 currently stores a "10" and a user views the corresponding active viewing region, then active viewing region tracker 220 may increment the "10" to a "11" and store the "11" in user viewing count field 430.

Active viewing region tracker 220 may determine the user viewing time associated with the active viewing region of identified content (block 1430). Each time the portion of the document, identified by document ID field 410 and active viewing region 420, is viewed by a user, active viewing region tracker 220 may, in conjunction with browser 205, determine an amount of time the active viewing region is viewed by the user (i.e., until the user scrolls to another active viewing region) and may determine an overall average viewing time for the active viewing region (e.g., across all users) based on the most recently measured amount of viewing time. The determined average viewing time may be stored in user viewing time field 440 of tracking DB 225. In an exemplary implementation, the viewing time information may be used by search engine 230 to identify more relevant content. For example, a portion of context may be identified based on viewing time and may be used to identify content of interest to the user.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 14, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

retrieving a document;

receiving a user-selection of a portion of the document;

rendering and displaying the user-selected portion of the document in a window of a browser, wherein the user-selected portion of the document comprises less than an entirety of the document;

identifying the user-selected portion of the document, that is rendered and displayed in the window of the browser, as an active viewing region based on whether the user-selected portion of the document is displayed within the window of the browser for at least a minimum threshold period of time;

determining a number of times that the user-selected portion of the document has been rendered and displayed in a browser for viewing by a user and other first users and identified as the active viewing region;

determining an amount of time that the user and other second users have viewed the user-selected portion of the document rendered and displayed in a browser and identified as the active viewing region;

scanning the identified active viewing region to generate a scan;

generating context from the scan of the identified active viewing region; and executing a search of a corpus of documents using the generated context and the amount of time that the user and the other second users have viewed the user-selected portion of the document rendered and displayed in a browser and identified as the active viewing region.

2. The method of claim 1, wherein the corpus of documents comprises a set of advertisements or a corpus of Hypertext Markup Language (HTML) documents.

3. The method of claim 1, wherein generating the context from the scan comprises:
    extracting a sequence of text from within the scan to generate the context.

4. The method of claim 1, wherein executing the search of the corpus of documents comprises:
    matching content from the corpus of documents with the generated context.

5. The method of claim 4, wherein matching the content from the corpus of documents with the generated context comprises:
    identifying a sequence of text within the scan to generate the context; and
    matching at least a portion of the sequence of text with text contained within the content of the corpus of documents.

6. A method, comprising:
    obtaining a Hypertext Markup Language (HTML) document;
    receiving a user-selection of a portion of the HTML document;
    rendering and displaying the user-selected portion of the HTML document in a browser, wherein the portion of the HTML document comprises less than an entirety of the HTML document;
    identifying the user-selected portion of the HTML document that is rendered and displayed in a window of the browser as an active viewing region based on whether the user-selected portion of the HTML document is displayed within the window of the browser for at least a minimum threshold period of time;
    retrieving a script;
    executing the script to programmatically extract text from the identified active viewing region of the HTML document to provide a string of text, wherein the script is retrieved from:
        1) a toolbar of the browser, or
        2) an external server; and
    using the string of text to perform a search to obtain relevant search results.

7. The method of claim 6, wherein the active viewing region of the HTML document rendered and displayed in the browser is selected by a user of the browser via controls associated with the browser.

8. A device, comprising:
    a communication interface configured to obtain a document from a content hosting server; and
    a processing unit configured to:
        receive a user-selection of a portion of the document,
        render and cause to be displayed the user-selected portion of the document in a window of the browser,
        identify the user-selected portion of the document rendered and displayed in a window of the browser as an active viewing region based on whether the user-selected portion of the document is displayed within the window of the browser for at least a minimum threshold period of time,
        determine a number of times that the user-selected portion of the document has been rendered and displayed in a browser for viewing by a user and other first users and identified as the active viewing region,
        determine an amount of time that the user and other second users have viewed the user-selected portion of the document rendered and displayed in a browser and identified as the active viewing region,
        generate context from the identified active viewing region,
    wherein the communication interface is further configured to send the generated context, and the determined amount of time, for use by a search engine for performing a search of a corpus of documents to obtain search results.

9. The device of claim 8, wherein, when generating the context, the processing unit is configured to:
    scan the active viewing region rendered and displayed in the window of the browser.

10. The device of claim 9, wherein, when generating the context from the user-selected portion of the content, the processing unit is further configured to:
    generate the context based on the scan of the active viewing region displayed in the window of the browser.

11. The device of claim 8, wherein the document comprises a Hypertext Markup Language (HTML) document.

12. A device, comprising:
    a communication interface configured to retrieve a Hypertext Markup Language (HTML) document from a content hosting server;
    a processing unit configured to:
        receive a user-selection of a portion of the HTML document,
        render and cause to be displayed the user-selected portion of the HTML document in a browser, wherein the user-selected portion of the HTML document comprises less than an entirety of the HTML document;
        identify the user-selected portion of the HTML document that is rendered and displayed in a window of the browser as an active viewing region based on whether the user-selected portion of the HTML document is displayed within the window of the browser for at least a minimum threshold period of time,
        retrieve a script;
        execute the script to programmatically extract text from the identified active viewing region of the HTML document to provide a string of text, wherein the script is retrieved from:

1) a toolbar of the browser, or
2) an external server via the communication interface; and send the string of text, via the communication interface, to a search engine to perform a search to obtain relevant search results.

13. The method of claim 6, further comprising:

determining a number of times that the user-selected portion of the HTML document has been rendered and displayed in a browser for viewing by a user and other first users and identified as the active viewing region, determining an amount of time that the user and other second users viewed the user-selected portion of the HTML document rendered and displayed in a browser and identified as the active viewing region, and further using the determined number of times that the user-selected portion of the HTML document has been viewed by the user and the other first users, or the determined amount of time that the user and the other second users viewed the user-selected portion of the HTML document, to perform the search to obtain relevant search results.

14. The device of claim 12, wherein the active viewing region of the HTML document rendered and displayed in the browser is selected by a user of the browser via controls associated with the browser.

15. The device of claim 12, wherein the processing unit is further configured to:

determine a number of times that the user-selected portion of the HTML document has been rendered and displayed in a browser for viewing by a user and other first users and identified as the active viewing region, and determine an amount of time that the user and other second users viewed the user-selected portion of the HTML document rendered and displayed in a browser and identified as the active viewing region, wherein the determined number of times that the user-selected portion of the HTML document has been viewed by the user and the other first users, or the determined amount of time that the user and the other second users viewed the user-selected portion of the HTML document are used to perform the search to obtain relevant search results.

16. The method of claim 1, wherein the user-selected portion of the document rendered and displayed in the browser and identified as the active viewing region is selected by the user via controls associated with the browser.

17. The device of claim 8, wherein the portion of the document rendered and displayed in the browser and identified as the active viewing region is selected by the user of the browser via controls associated with the browser.

18. The method of claim 1, wherein executing the search of the corpus of documents further comprises using the determined number of times the user-selected portion of the content has been rendered and displayed in a browser for viewing by the user and the other first users and identified as the active viewing region.

19. The method of claim 1, wherein the minimum threshold period of time comprises at least five seconds of time.

20. The method of claim 6, wherein the minimum threshold period of time comprises at least five seconds of time.

* * * * *